United States Patent Office 3,296,332
Patented Jan. 3, 1967

3,296,332
COMPOSITION COMPRISING THE REACTION PRODUCT OF DICYCLOPENTADIENE WITH ANOTHER EPOXY COMPOUND, A POLYCARBOXYLIC ACID ANHYDRIDE, AND A POLYOL
Vance A. Chase and Stewart A. Miller, Marion, Va., assignors to Brunswick Corporation, a corporation of Delaware
No Drawing. Filed Apr. 24, 1963, Ser. No. 275,209
4 Claims. (Cl. 260—835)

This is a continuation-in-part of our copending application Serial No. 28,848, filed May 13, 1960, now abandoned.

A

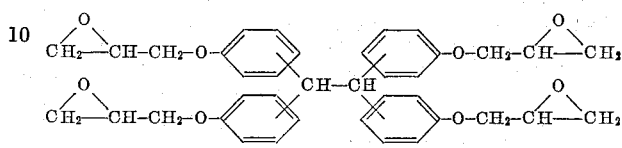

B

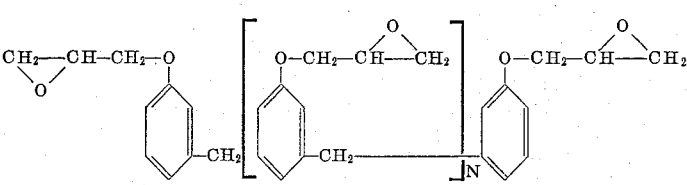

This invention relates to a plastic material and more particularly to a heat resistant rigid epoxy material.

Epoxy materials or resins are generally considered difficult to process for uses at elevated temperatures. Generally also at elevated temperatures, these resins are not satisfactorily capable of retaining their structural properties. For these reasons, epoxy resins are generally not satisfactory as laminating resins, adhesives, potting and encapsulating material, molding compounds and coating materials which will be serviceable up to and including 600° F.

It is therefore an object of this invention to provide a heat resistant rigid epoxy material which overcomes the objection set forth above.

It is a further object of this invention to provide such a material which is heat resistant and retains its structural properties at elevated temperatures.

It is yet another object of this invention to provide a resin system that may be effectively used in vacuum laminating without added diluents.

It is yet another object of this invention to provide a substantially rigid heat resistant plastic product which comprises the cured reaction product of a mixture of epoxy compounds containing at least a portion of dicyclopentadiene dioxide, a polyol and an organic acid.

Other objects and advantages of the invention will become apparent from the following description.

The epoxy resins having high heat resistant properties while still being capable of retaining their structural properties at elevated temperatures, can be produced by including a portion of dicyclopentadiene dioxide with a more conventional epoxy resin, thereafter adding a compound which acts in the nature of a cross-linking agent and curing the resulting product. The addition of dicyclopentadiene dioxide, it has been found, increases the heat resistance and properties of the resulting resin, provides a product which retains its structural properties at elevated temperatures and one which is relatively simple to work with. The resulting product is useful at high temperatures for a laminating resin, adhesive, potting and encapsulating material, molding compound, coating material and the like. It is quite useful for the fabrication of glass reinforcing parts by vacuum molding and filament winding techniques.

Dicyclopentadiene dioxide is an epoxy compound having two 1,2-epoxy groups per molecule. Its highly compact structure makes possible epoxy plastics with outstanding high temperature physical and electrical properties.

In compounding the epoxy resin, it is desirable that a mixture of 1,2-epoxy compounds be made with the mixture containing at least a portion of the dicyclopentadiene dioxide. A great number of other epoxy compounds are usable for this purpose. However, particular compounds which have shown desirable characteristics are epoxy compounds having the following structural formulae:

Epoxy compounds having the above structural formulae are multi-functional and thermosetting. Examples of usable compounds of Formula B are the liquid epoxy Novolacs such as have been produced and marketed as the X-2638 series by Dow Chemical Company. Although such compounds are indicated as liquid, they include the viscous liquid and semi-solid epoxy compounds of Formula B. The epoxy Novolac compounds of the X-2638 series have greater than the maximum functionality of 2.0 attributable to glycidyl ethers of bisphenols, the Novolacs having from about 2.2 to 3.2 epoxy groups per molecule. In the above formula, N represents the functionalities in excess of 2, which in the case of the X-2638 series may range, for example, from .2 to 1.2.

Typical properties of suitable Novolacs are, for example:

|  | X-2638.1 | X-2638.3 |
|---|---|---|
| Physical Appearance | (1) | (2) |
| Maximum Gardner Color | 7 | 7 |
| Viscosity, cps., 100° F | 10,000 | >100,000 |
| Viscosity, cps., 125° F | 1,200 | 60,000 |
| Viscosity, cps., 180° F | 150 | 1,100 |
| Viscosity, cps., 80% N.V. in Dowanol DB | 700 | 5,000 |
| Viscosity, cps., 80% N.V. in MEK | 57 | 230 |
| Viscosity, cps., 80% N.V. in Toluene | 115 | 600 |
| Specific gravity 25° C./4° C | 1.2000 | 1.2200 |
| Epoxide Equivalent Weight | 172–178 | 175–182 |
| Maximum total chloride, percent | 0.249 | 0.249 |
| Maximum total volatiles [3], percent | 0.2 | 0.2 |

[1] Viscous liquid.
[2] Semisolid.
[3] Weight loss at 150° C. and 10 mm. Hg for 15 minutes.

An example of the composition of Formula A above is Epon 1310 with the properties:

Total Cl, percent wt. _____ 0.64
Sap. Cl, percent wt. _____ 0.38
Epoxy value, eq./100 g. _____ 0.459
Total hydroxyl, eq./100 g. _____ 0.12
Durran softening point (176° F.) _____ ° C__ 80
Molecular wt. _____ 703

Other specific 1,2-epoxy compositions include such resins as D.E.N. 438 and QX-2638.7, Dow Chemical Company designation and reputed to have the structure of Formula B, above, having epoxide equivalent weight ranges of 175–182 and 194–210 and molecular weight ranges of 350–364 and 388–420 respectively. Although a variety of 1,2-epoxy compounds may be used, those of the above formulae give excellent results. The compositions of the above formulae fall within the group of normally liquid 1,2-epoxy compounds which are polyfunctional with respect to terminal epoxy groups, being of a structure having an epoxidized hydrocarbon chain linked through oxygen to each of a plurality of aromatic nuclei which may in turn be linked together by methylene or lower polymethylene groups. The 1,2-epoxy compounds are usually mixtures of varying molecular weights and preferably include an average of more than 2.0 terminal epoxy groups per molecule.

In the preparation of the epoxy product, an additional compound or cross-linking agent is used. The compound may be made in situ during the reaction to provide the highly heat resistant epoxy plastic. The cross-linking agent is produced by a reaction between a polyol such as polyhydric phenol or preferably a lower alkyl polyol, e.g., trimethylol ethane or trimethylol propane, and an organic acid compound or anhydride and particularly an unsaturated carboxylic acid or anhydride such as maleic anhydride. As usual, throughout this specification and claims, the term carboxylic acid is used in its generic sense and includes polycarboxylic acid anhydrides, e.g., dicarboxylic and anhydrides such as maleic anhydride.

The reaction of a polyol with a polycarboxylic acid is well known and the reactants known for such reaction can be used herein. The polyols include the diols and the polycarboxylic acids include the dicarboxylic acids. The lower alkyl polyols and lower unsaturated dicarboxylic acids are preferred herein.

Typical polycarboxylic acids known for esterification or reaction with polyols are oxalic acid, malonic acid, succinic acid, glutaric acid, adipic acid, pimelic acid, suberic acid, azelaic acid, sebacic acid, alkylsuccinic acids, alkenylsuccinic acids, fumaric acid, itaconic acid, citraconic acid, mesaconic acid, glutaconic acid, muconic acid, alpha-hydromuconic acid, diglycolic acid, dilactic acid, dithioglycolic acid, hexynedioic acid, cyclohexanedicarboxylic acid, phthalic acid, isophthalic acid, terephthalic acid, tetrahydrophthalic acid, naphthalenedicarboxylic acid, cinnamic acid, benzenetricarboxylic acid, benzenetetracarboxylic acid and the like.

Typical polyols known for esterification of reaction with polycarboxylic acids are ethylene glycol, diethylene glycol, triethylene glycol, tetraethylene glycol, propylene glycol, dipropylene glycols, tripolylene glycols, polyoxyethylene glycols, polyoxypropylene glycols, butylene glycol, pentanediol, dimethyltrimethylene glycol, hexanediol, methylpentanediol, diethylpropanediol, diethylhexanediol, dimethylolhexane, butenediol, glycerol, trimethylolmethane-hexane-1,2,6-triol, pentaerythritol, diglycerol, erythrol, pentaglycerol, dipentaerythritol, polyvinyl alcohols and typical polyhydric phenols include resorcinol, catechol, hydroquinine, the dihydroxynaphthalenes, the dihydroxyanthracenes, the dihydroxyanthraquinones, the dihydroxytoluenes, the dihydroxyxylenes, chlorohydroquinone, the dihydroxybenzaldehydes, hydroxyhydroquinone, tetrahydroxyquinone, trihydroxyanthraquinones, hexahydroxybenzene, dihydroxydiphenylmethane, the diphenylolmethanes, and the like. Other suitable polyols and polycarboxylic acids are well known and will be apparent to those in the art.

In one example of compounding the epoxy plastic of this invention, a mixture of 100 parts by weight of dicyclopentadiene dioxide, 38.8 parts by weight of Epon 1310 epoxy resin, the structural formula A which is recited above, and 72.7 parts of maleic anhydride are heated to 180–200° F. until all the components have become melted and are completely mixed. Thereafter, 16 parts by weight of trimethylol ethane is then added at a temperature of between about 170–190° F. As soon as the trimethylol ethane becomes dissolved, the resin mixture may be cooled down or immediately may be cured. Cure or polymerization of the resin is accomplished by heating it at 250° F., a normal curing temperature, for about three hours.

After the resin is cured, it is desirable to post cure it at elevated temperature above normal curing temperature up to the intended service temperature in order to provide optimum strength. For example, it may be cured for about three hours at 250° F. or 350° F. then four hours at 450° F. or three hours at 500° F. the time and temperature being varied dependent upon the intended service temperature up to about 600° F.

The foregoing detailed description has been given for clearness of understanding only, and no unnecessary limitations should be understood therefrom, for some modifications will be obvious to those skilled in the art.

We claim:

1. A substantially rigid heat resistant plastic product, comprising: the reaction product of dicyclopentadiene dioxide, a member of the class consisting of 1,2-epoxy compounds having the following structural formulae:

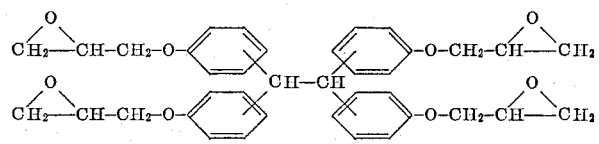

and

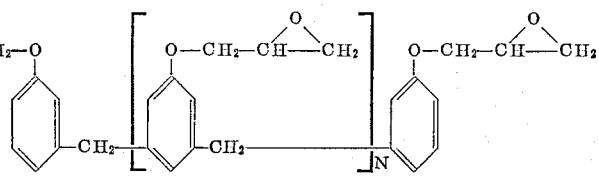

wherein N is a value greater than zero, a lower alkyl polyol and maleic anhydride, said reaction product having been cured at a temperature of about 300° F. for about three hours and post cured at temperatures up to about 500° F. for a time necessary to provide substantial heat resistance at intended service temperatures.

2. A substantially rigid heat resistant plastic product, comprising: the reaction product of dicyclopentadiene dioxide, a member of the class consisting of 1,2-epoxy compounds having the following structural formulae:

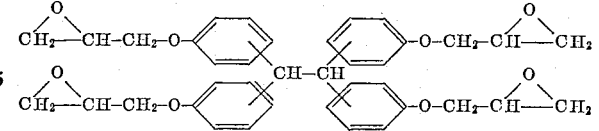

and

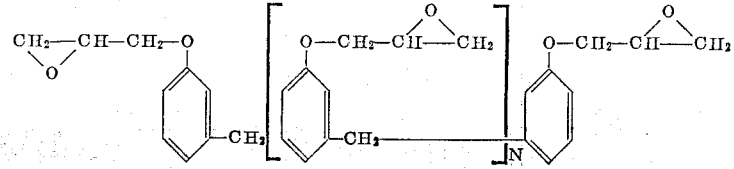

wherein N is a value greater than zero, a member of the class consisting of trimethylol ethane and trimethylol propane, and maleic anhydride, said reaction product having been cured at a temperature of about 250° F. for about three hours and post cured at temperatures up to about 500° F. for a time necessary to provide substantial heat resistance at intended service temperatures.

3. A substantially rigid heat resistant plastic product, comprising: the reaction product of about 100 parts by weight of dicyclopentadiene dioxide, 38.8 parts by weight of a 1,2-epoxy compound having the following structural formula:

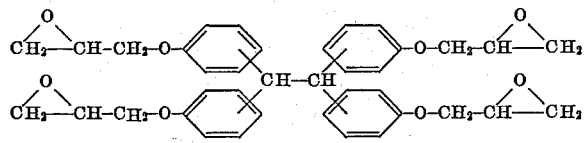

16 parts by weight of a member of the class consisting of trimethylol ethane and trimethylol propane, and 72.7 parts by weight of maleic anhydride, said reaction product having been cured at a temperature of about 250° F. for about three hours and post cured at temperatures up to about 500° F. for a time necessary to provide substantial heat resistance at intended service temperatures.

4. A substantially rigid heat resistant plastic product, comprising: the reaction product of about 3 parts by weight of dicyclopentadiene dioxide, about 1 part by weight of a 1,2-epoxy compound having the following structural formula:

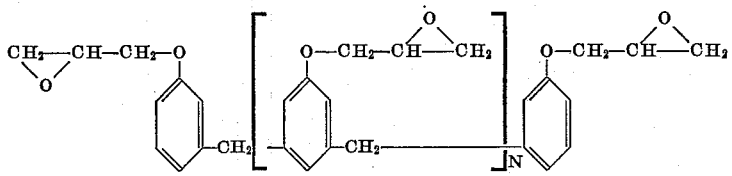

wherein N is a value of about .2 to 1.2, maleic anhydride and a member of the class consisting of trimethylol ethane and trimethylol propane, said reaction product having been cured at a temperature of about 250° F. for about three hours and post cured at temperatures up to about 500° F. for a time necessary to provide substantial heat resistance at intended service temperatures.

References Cited by the Examiner

UNITED STATES PATENTS

| | | | |
|---|---|---|---|
| 2,962,469 | 11/1960 | Phillips et al. | 260—835 |
| 2,985,616 | 5/1961 | McGary et al. | 260—861 |

OTHER REFERENCES

Diepoxides With Improved Properties, Beasley, SPE Journal, April 1959, volume 15, TP 986 A152, pp. 289–291.

MURRAY TILLMAN, Primary Examiner.

J. C. BLEUTGE, Assistant Examiner.